United States Patent
Oyobe et al.

(10) Patent No.: US 8,000,852 B2
(45) Date of Patent: Aug. 16, 2011

(54) VEHICLE PREFERENTIAL TREATMENT SYSTEM, ELECTRICALLY POWERED VEHICLE, SERVER USED FOR VEHICLE PREFERENTIAL TREATMENT SYSTEM, AND VEHICLE PREFERENTIAL TREATMENT METHOD

(75) Inventors: Hichirosai Oyobe, Toyota (JP); Makoto Nakamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 69 days.

(21) Appl. No.: 12/461,542

(22) Filed: Aug. 14, 2009

(65) Prior Publication Data

US 2009/0306842 A1     Dec. 10, 2009

Related U.S. Application Data

(62) Division of application No. 11/515,992, filed on Sep. 6, 2006, now Pat. No. 7,603,211.

(30) Foreign Application Priority Data

Sep. 29, 2005   (JP) ................ 2005-285044

(51) Int. Cl.
*B60L 9/00* (2006.01)
*B60L 11/00* (2006.01)
(52) U.S. Cl. ........................................ 701/22
(58) Field of Classification Search .................. None
See application file for complete search history.

(56) References Cited

U.S. PATENT DOCUMENTS

| 6,183,100 | B1 * | 2/2001 | Suckow et al. | 362/35 |
|---|---|---|---|---|
| 6,484,088 | B1 * | 11/2002 | Reimer | 701/123 |
| 6,697,717 | B2 * | 2/2004 | Shioda et al. | 701/22 |
| 7,239,965 | B2 * | 7/2007 | Wehrlen et al. | 701/213 |
| 2004/0102895 | A1 * | 5/2004 | Thayer et al. | 701/200 |
| 2005/0021191 | A1 | 1/2005 | Taniguchi et al. | |
| 2005/0143876 | A1 | 6/2005 | Tanase | |

FOREIGN PATENT DOCUMENTS

| CN | 1294994 A | 5/2001 |
|---|---|---|
| JP | A 07-107617 | 4/1995 |
| JP | A-2001-078304 | 3/2001 |
| JP | A 2001-128301 | 5/2001 |
| JP | A 2001-266290 | 9/2001 |
| JP | A 2002-163756 | 6/2002 |
| JP | A-2002-170138 | 6/2002 |
| JP | A 2003-111208 | 4/2003 |
| JP | A-2005-016443 | 1/2005 |
| JP | A-2005-030369 | 2/2005 |

OTHER PUBLICATIONS

Office Action issued in Japanese Application No. 2005-285044; mailed Jul. 27, 2010. (with translation).

* cited by examiner

*Primary Examiner* — John Q Nguyen
*Assistant Examiner* — Nicholas Kiswanto
(74) *Attorney, Agent, or Firm* — Oliff & Berridge, PLC

(57) ABSTRACT

A vehicle preferential treatment system includes a controller mounted in a hybrid vehicle, and a server performing wireless communications with the controller. The controller estimates an SOC of an electric storage (not shown) and transmits the SOC to the server. When the SOC of the electric storage exceeds a reference level, the server gives a preferential treatment to the hybrid vehicle. Then, information on the preferential treatment is transmitted from the server to the controller, and is displayed on a display unit of the controller.

3 Claims, 8 Drawing Sheets

PREFERENTIAL TREATMENT DISPLAY

VEHICLE PREFERENTIAL TREATMENT SYSTEM, ELECTRICALLY POWERED VEHICLE, SERVER USED FOR VEHICLE PREFERENTIAL TREATMENT SYSTEM, AND VEHICLE PREFERENTIAL TREATMENT METHOD

CROSS-REFERENCE TO RELATED APPLICATION

This is a Division of application Ser. No. 11/515,992 filed Sep. 6, 2006, which in turn claims the benefit of Japanese Patent Application No. 2005-285044 filed Sep. 29, 2005. The disclosure of the prior applications are hereby incorporated by reference herein in their entirety.

BACKGROUND

1. Field of the Invention

The present invention relates to a vehicle preferential treatment system, an electrically powered vehicle and a server. In particular, the present invention relates to a vehicle preferential treatment system for preferentially treating electrically powered vehicles such as hybrid vehicles and electric vehicles, and an electrically powered vehicle and a server used in the system.

2. Description of the Background Art

As environment-friendly vehicles, electrically powered vehicles such as hybrid vehicles and electric vehicles have drawn attention. A hybrid vehicle is a vehicle using, in addition to an engine conventionally used as a power source, a DC power source, an inverter and a motor driven by the inverter as power sources as well. An electric vehicle is a vehicle using a DC power source, an inverter and a motor driven by the inverter as power sources. Hybrid vehicles have already been marketed and practically used.

In recent years, attempts to realize environmental protection by giving preferential treatment to environment-friendly vehicles such as hybrid vehicles so as to urge transformation to environment-friendly vehicles including electrically powered vehicles have started. For example, in California, U.S.A, an operation to give preferential treatment to vehicles satisfying rigid exhaust criteria and fuel-consumption criteria such as hybrid vehicles are carried out to allow them to travel HOV lanes (High Occupancy Vehicle lanes). The HOV lanes are priority lanes where only share-ride vehicles are allowed to travel and there is less traffic congestion compared with ordinary lanes, enabling comfortable driving.

A system to give preferential treatment to specific vehicles is well known. For example, Japanese Patent Laying-Open No. 2002-163756 discloses an exclusive road entry/exit control system for automatic travel vehicles. In this system, communications are carried out between a ground road-to-vehicle communication device and a communication device of a vehicle of AHS (Advanced cruise-assist Highway Systems: travel support track systems), and automatic inspection of an automatic traveling function and identification of AHS vehicles are carried out. Then, only AHS vehicles are allowed to enter an exclusive road, and registration processing of a vehicle ID when entering the exclusive road and erasure processing of the vehicle ID when leaving from the exclusive road are carried out.

In the current background that hybrid vehicles are used increasingly, it is convenient to apply the system as disclosed in Japanese Patent Laying-Open No. 2002-163756 by referring to the operation in California, U.S.A. for example, to electrically powered vehicles such as hybrid vehicles for those managing the preferential treatment given to electrically powered vehicles and for those using electrically powered vehicles to which the preferential treatment is given.

However, there may be a case where contributions are not always given to environmental protection by giving the preferential treatment uniformly to electrically powered vehicles by identifying types of vehicles (whether an electrically powered vehicle or an ordinary vehicle in which an engine is the only power source) as the system disclosed in Japanese Patent Laying-Open No. 2002-163756. For example, even in a hybrid vehicle, if it travels depending largely on the engine, it cannot be said as contributing to environmental protection.

SUMMARY

Therefore, the present invention has been developed to solve the problem. An object of the present invention is to provide a vehicle preferential treatment system capable of giving preferential treatment to electrically powered vehicles making large contributions to environmental protection.

Further, another object of the present invention is to provide an electrically powered vehicle capable of being treated preferentially if it makes large contributions to environmental protection.

Further, another object of the present invention is to provide a server for giving preferential treatment to electrically powered vehicles making large contributions to environmental protection.

According to this invention, a vehicle preferential treatment system includes an electrically powered vehicle and a server capable of communicating with the electrically powered vehicle. The electrically powered vehicle includes: an electric storage; a motor generating a driving force of the vehicle by using electric power from the electric storage; an estimation unit estimating a state of charge (SOC) of the electric storage; a first transmission unit transmitting a state quantity estimated by the estimation unit to the server; a first reception unit receiving information on a predetermined preferential treatment with respect to the electrically powered vehicle from the server; and a display unit displaying the received information. The server includes: a second reception unit receiving the state quantity indicating the state of charge of the electric storage from the electrically powered vehicle; a determination unit determining whether to give the predetermined preferential treatment to the electrically powered vehicle based on the state quantity; and a second transmission unit transmitting the information on the predetermined preferential treatment to the electrically powered vehicle based on the determination result by the determination unit.

Preferably, the determination unit determines to give the predetermined preferential treatment to the electrically powered vehicle when the state quantity indicating the state of charge of the electric storage exceeds a predetermined value.

Further, according to the present invention, a vehicle preferential treatment system includes an electrically powered vehicle and a server capable of communicating with the electrically powered vehicle. The electrically powered vehicle includes: an electric storage; a motor generating a driving force of the vehicle by using electric power from the electric storage; a charging unit charging the electric storage from a commercial power source; a calculation unit calculating a charge amount or a charge time by the charging unit; a first transmission unit transmitting the charge amount or the charge time calculated by the calculation unit to the server; a first reception unit receiving information on a predetermined preferential treatment with respect to the electrically powered vehicle from the server; and a display unit displaying the received information. The server includes: a second reception unit receiving the charge amount or the charge time from the commercial power source to the electric storage, from the electrically powered vehicle; a determination unit determining whether to give the predetermined preferential treatment to the electrically powered vehicle based on the charge amount or the charge time; and a second transmission unit transmitting information on the predetermined preferential treatment to the electrically powered vehicle based on the determination result by the determination unit.

Preferably, the determination unit determines to give the predetermined preferential treatment to the electrically powered vehicle when the charge amount from the commercial power source to the electric storage exceeds a predetermined value or the charge time from the commercial power source to the electric storage exceeds a predetermined time.

Preferably, the electrically powered vehicle further includes an announcement unit announcing, when the predetermined preferential treatment is given, the fact to the outside of the vehicle.

Further, according to the present invention, an electrically powered vehicle includes: an electric storage; a motor generating a driving force of the vehicle by using electric power from the electric storage; an estimation unit estimating a state of charge (SOC) of the electric storage; a transmission unit transmitting the state quantity estimated by the estimation unit to a server determining whether to give a predetermined preferential treatment to the electrically powered vehicle based on the state quantity indicating the state of charge of the electric storage; a reception unit receiving information on the predetermined preferential treatment from the server; and a display unit displaying the received information.

Further, according to the present invention, an electrically powered vehicle includes: an electric storage; a motor generating a driving force of the vehicle by using electric power from the electric storage; a charging unit charging the electric storage from a commercial power source; a calculation unit calculating a charge amount or a charge time by the charging unit; a transmission unit transmitting the charge amount or the charge time calculated by the calculation unit to a server for determining whether to give a predetermined preferential treatment to the electrically powered vehicle based on the charge amount or the charge time from the commercial power source to the electric storage; a reception unit receiving information on the predetermined preferential treatment from the server; and a display unit displaying the received information.

Preferably, the electrically powered vehicle further includes an announcement unit announcing, when the predetermined preferential treatment is given, the fact to the outside of the vehicle.

Further, according to the present invention, a server includes: a reception unit receiving a state quantity indicating a state of charge (SOC) of an electric storage from an electrically powered vehicle using, as a power source, a power generator generating a driving force of the vehicle by using electric power from the electric storage; a determination unit determining whether to give a predetermined preferential treatment to the electrically powered vehicle based on the received state quantity; and a transmission unit transmitting information on the predetermined preferential treatment to the electrically powered vehicle based on the determination result by the determination unit.

Preferably, the determination unit determines to give the predetermined preferential treatment to the electrically powered vehicle when the state quantity indicating the state of charge of the electric storage exceeds a predetermined value.

Further, according to the present invention, a server includes: a reception unit receiving a charge amount or a charge time of an electric storage by a commercial power source, from an electrically powered vehicle in which the electric storage is chargeable from the commercial power source; a determination unit determining whether to give a predetermined preferential treatment to the electrically powered vehicle based on the charge amount or the charge time received; and a transmission unit transmitting information on the predetermined preferential treatment to the electrically powered vehicle based on the determination result by the determination unit.

Preferably, the determination unit determines to give the predetermined preferential treatment to the electrically powered vehicle when the charge amount from the commercial power source to the electric storage exceeds a predetermined value or the charge time from the commercial power source to the electric storage exceeds a predetermined time.

In the present invention, a state of charge (SOC) of an electric storage is estimated in an electrically powered vehicle, and the estimated state quantity is transmitted to a server. A determination unit of the server determines whether to give a predetermined preferential treatment to the electrically powered vehicle, based on the state quantity showing the state of charge of the electric storage received from the electrically powered vehicle. For example, if the electrically powered vehicle is a hybrid vehicle, it is determined that dependency on the engine is lower as the state quantity showing the state of charge of the electric storage is larger, and contributions to environmental protection is higher, so the predetermined preferential treatment is given. As the predetermined preferential treatment, permission to travel into specific areas (natural conservation areas or urban areas), permission to travel in an exclusive lane on a road consisting of a plurality of lanes, or a discount rate for a toll road may be given. Information on the predetermined preferential treatment including the determination result of preferential treatment availability is transmitted from the server to the electrically powered vehicle, and the information on the preferential treatment is displayed on a display unit of the electrically powered vehicle.

Therefore, according to the present invention, it is possible to give a preferential treatment to an electrically powered vehicle making high contributions to environmental protection.

Further, in the present invention, the charge amount or the charge time from the commercial power source to the electric storage in an electrically powered vehicle in which the electric storage is chargeable from the commercial power source is calculated, and the calculated charge amount or charge time is transmitted to the server. The determination unit of the server determines whether to give the predetermined preferential treatment to the electrically powered vehicle, based on the charge amount or the charge time from the commercial power source received from the electrically powered vehicle. For example, if the electrically powered vehicle is a hybrid vehicle in which from charging from external source is possible, dependency on the engine becomes lower as the charge amount from the commercial power source is larger or the charge time from the commercial power source is longer. Consequently, it is determined that contributions to environmental protection are high, so the predetermined preferential treatment is given. Then, information on the predetermined preferential treatment including the determination result of preferential treatment availability is transmitted from the server to the electrically powered vehicle, and the information on the preferential treatment is displayed on the display unit of the electrically powered vehicle.

Therefore, according to the present invention, a preferential treatment can be given to an electrically powered vehicle making high contributions to environmental protection.

Further, according to the present invention, when a predetermined preferential treatment is given, the fact is announced to the outside of the vehicle by an announcement unit. Therefore, it is possible to identify a vehicle illegally traveling in a specific area (natural conservation area, urban area or the like) or in an exclusive lane.

The foregoing and other objects, features, aspects and advantages of the present invention will become more apparent from the following detailed description of the present invention when taken in conjunction with the accompanying drawings.

DETAILED DESCRIPTION OF EMBODIMENTS

Figure 1:
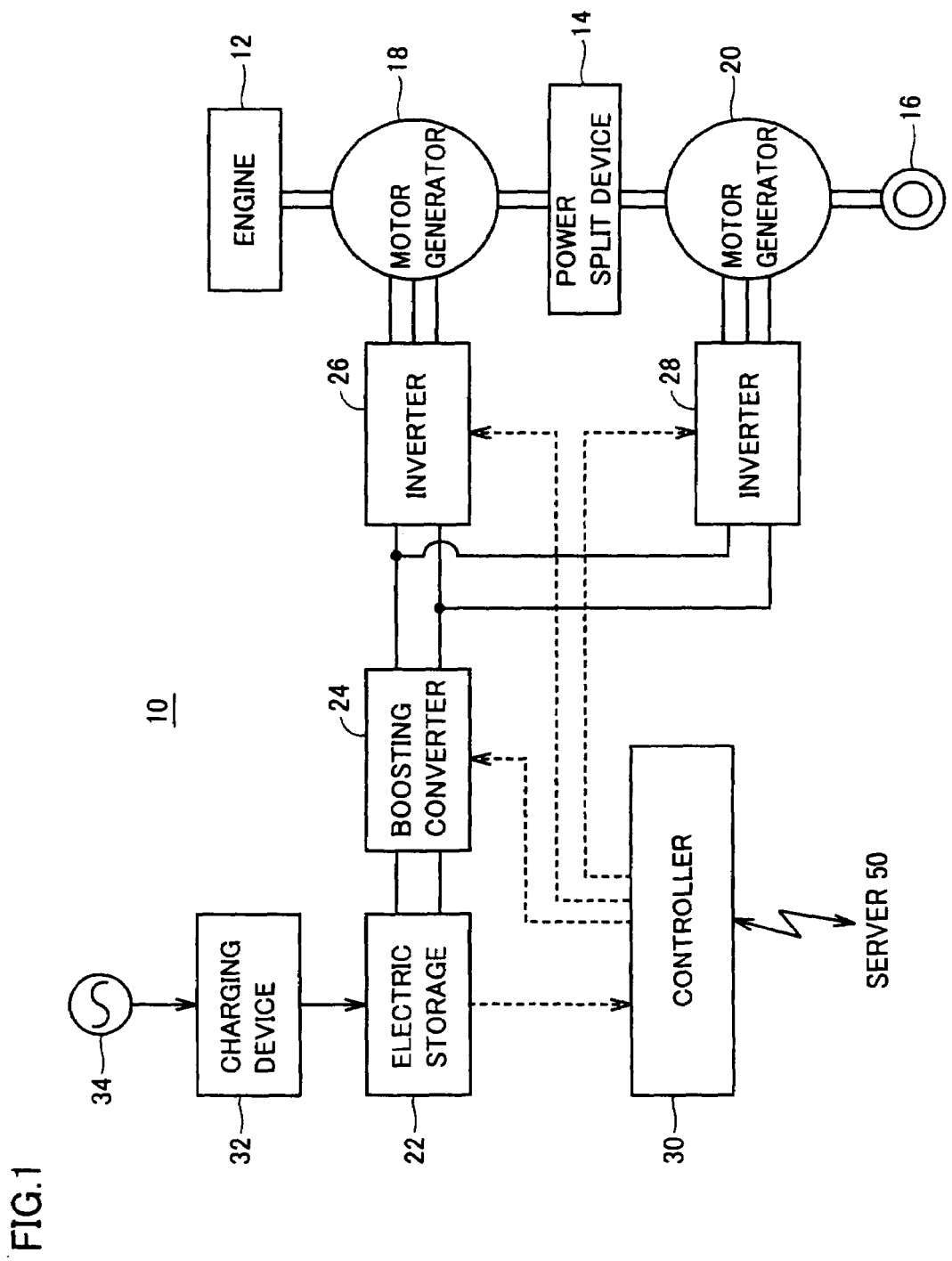
FIG. 1 is a schematic configuration diagram of a hybrid vehicle shown as one example of an electrically powered vehicle used in a vehicle preferential treatment system according to embodiment 1 of the present invention.

Hereinafter, embodiments of the present invention will be described in detail with reference to the drawings. Note that same or corresponding parts in the drawings are denoted by same reference numerals, and description thereof will not be repeated.

Embodiment 1

FIG. 1 is a schematic configuration diagram of a hybrid vehicle shown as an example of an electrically powered vehicle used in a vehicle preferential treatment system according to embodiment 1 of the present invention. Referring to FIG. 1, a hybrid vehicle 10 includes an engine 12, a power split device 14, a wheel 16, motor generators 18 and 20, an electric storage 22, a boosting converter 24, inverters 26 and 28, a controller 30, and a charging device 32.

Power split device 14 is a linked to engine 12 and to motor generators 18 and 20 so as to distribute power between them. As power split device 14, a planetary gear having three rotational shafts of a sun gear, a planetary carrier and a ring gear can be used, for example. The three rotational shafts are linked to the rotational shafts of engine 12 and motor generators 18 and 20, respectively. For example, by forming a rotor of motor generator 18 to be hollow and inserting a crank shaft of engine 12 in the center thereof, it is possible to mechanically connect engine 12 and motor generators 18 and 20 to power split device 14.

Note that the rotational shaft of motor generator 20 is linked to wheel 16 by a reduction gear or an operating gear (not shown). Further, a decelerator with respect to the rotational shaft of motor generator 20 may be further incorporated inside power split device 14.

Motor generator 18 is incorporated in hybrid vehicle 10, operating as a power generator to be driven by engine 12 and as a motor capable of starting engine 12. Motor generator 20 is incorporated in hybrid vehicle 10 as a motor for driving wheel 16 which is a driving wheel.

Each of motor generators 18 and 20 is an AC motor consisting of a three-phase AC synchronous generator, for example. Motor generator 18 generates three-phase AC voltage by using power from engine 12, and outputs the generated three-phase AC voltage to inverter 26. Further, motor generator 18 generates a driving force by the three-phase AC voltage received from inverter 26, and starts engine 12.

Motor generator 20 generates driving torque of a vehicle by the three-phase AC voltage received from inverter 28. Further, motor generator 20 generates a three-phase AC voltage and outputs it to inverter 28 at a time of regenerative braking of the vehicle.

Electric storage 22 is a DC power source capable of charging and discharging, consisting of a secondary battery such as nickel hydrogen or lithium ion, for example. Electric storage 22 outputs DC power to boosting converter 24. Electric storage 22 is charged by the DC voltage outputted from boosting converter 24. Further, electric storage 22 can be charged from a commercial power source 34 by using charging device 32. Note that a large-capacity capacitor may be used as electric storage 22.

Boosting converter 24 boosts the DC voltage supplied from electric storage 22 and outputs it to inverters 26 and 28 based on a control signal from controller 30. Further, boosting converter 24 lowers the DC voltage received from one or both of inverters 26 and 28 to a voltage level of electric storage 22 based on the control signal from controller 30 to thereby charge electric storage 22. Boosting converter 24 is formed of, for example, a chopper circuit consisting of a reactor and two switching elements each having a flywheel diode.

Inverter 26 converts the DC voltage supplied from boosting converter 24 to the three-phase AC voltage based on the control signal from controller 30 to thereby drive motor generator 18. Further, inverter 26 converts the three-phase AC voltage generated by motor generator 18, upon receiving the power from engine 12, to a DC voltage based on the control signal from controller 30, and outputs the converted DC voltage to boosting converter 24.

Inverter 28 converts the DC voltage supplied from boosting converter 24 to the three-phase AC voltage based on the control signal from controller 30 to thereby drive motor generator 20. Further, inverter 28 converts, at the time of regenerative braking of the vehicle, the three-phase DC voltage generated by motor generator 20, upon receiving rotational force from wheel 16, to the DC voltage based on the control signal from controller 30, and then outputs the converted DC voltage to boosting converter 24.

Note that the regenerative braking mentioned herein includes braking involving regenerative power generation when a driver of hybrid vehicle 10 carries out foot braking operation, or deceleration (or stopping acceleration) of the vehicle while causing regenerative power generation by releasing an accelerating pedal during traveling, although operation of foot breaking is not carried out.

Charging device 32 converts a commercial AC voltage supplied from the commercial power source 34 to the DC voltage and outputs it to electric storage 22 to thereby charge electric storage 22. Note that charging device 32 may be an outside equipment of hybrid vehicle 10 without being mounted in hybrid vehicle 10.

Controller 30 generates control signals to control boosting converter 24 and inverters 26 and 28, and outputs the generated control signals to boosting converter 24 and inverters 26 and 28.

Further, controller 30 estimates the SOC of electric storage 22 based on charging/discharging currents and a voltage across terminals of electric storage 22 detected by a current sensor and a voltage sensor (not shown).

Further, controller 30 performs wireless communications with a server 50 giving a preferential treatment to hybrid vehicle 10 based on the SOC of electric storage 22. Then, controller 30 displays information on the preferential treatment received from server 50 to a user of hybrid vehicle 10.

Figure 2:
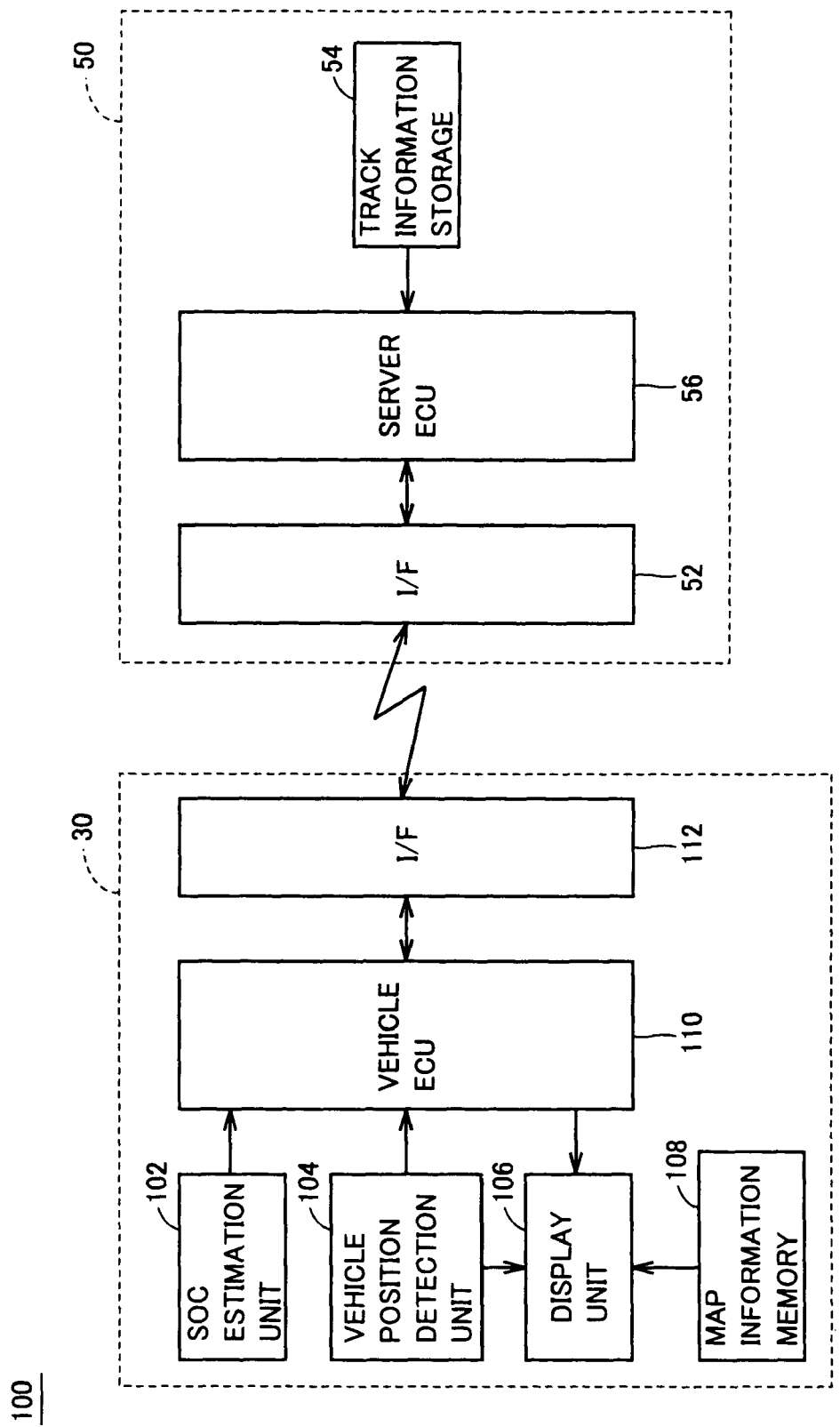
FIG. 2 is a function block diagram of the vehicle preferential treatment system according to embodiment 1 of the present invention.

FIG. 2 is a function block diagram of a vehicle preferential treatment system according to embodiment 1 of the present invention. Referring to FIG. 2, a vehicle preferential treatment system 100 includes controller 30 of hybrid vehicle 10 shown in FIG. 1 and server 50.

Controller 30 includes an SOC estimation unit 102, a vehicle position detection unit 104, a display unit 106, a map information memory 108, a vehicle ECU 110, and an interface unit 112. SOC estimation unit 102 estimates the SOC of electric storage 22 (not shown) as a state quantity of 0 to 100%, and outputs the estimated SOC to vehicle ECU 110. As methods of estimating the SOC of electric storage 22, various well-known methods such as a method of accumulating charging/discharging currents of electric storage 22 and a method of estimating based on a correlation between an open circuit voltage (OCV) and the SOC of electric storage 22 may be adopted.

Vehicle position detection unit 104 detects a current position of hybrid vehicle 10, and outputs position information on the detected current position to vehicle ECU 110 and display unit 106. As methods of detecting the vehicle position, well-known methods using such as the GPS (Global Positioning System) to measure the vehicle position by utilizing a satellite and beacons arranged on streets may be used.

Vehicle ECU 110 outputs the SOC of electric storage 22 received from SOC estimation unit 102 (hereinafter referred to as "SOC information") and the position information of hybrid vehicle 10 received from vehicle position detection unit 104 to interface unit 112. Further, vehicle ECU 110 outputs the SOC information from SOC estimation unit 102 to display unit 106.

Further, vehicle ECU 110 outputs preferential treatment track information and preferential treatment availability information from server 50, received by interface unit 112, to display unit 106. The preferential treatment track information is information on a track where hybrid vehicle 10 can travel when the SOC of electric storage 22 exceeds a reference level. That is, when the SOC of electric storage 22 does not exceed the reference level or a conventional car using the engine solely as the power source cannot travel on the track. The preferential treatment availability information is information showing whether it is possible to travel on the track with the current SOC of electric storage 22.

Interface unit 112 is a transceiver for performing wireless communications between controller 30 and server 50. Interface unit 112 transmits the SOC information and the position information from vehicle ECU 110 to server 50. Further, interface unit 112 outputs the preferential treatment track information and the preferential treatment availability information received from server 50, to vehicle ECU 110.

Display unit 106 receives the position information of hybrid vehicle 10 from vehicle position detection unit 104, and requests map information memory 108 for map data corresponding to the position information. Then, display unit 106 displays the map data from map information memory 108 and displays the current position of hybrid vehicle 10 based on the position information from vehicle position detection unit 104.

Further, upon receiving the preferential treatment track information from vehicle ECU 110, display unit 106 displays, with emphasis, the track where hybrid vehicle 10 can travel with the preferential treatment if the SOC of electric storage 22 exceeds the reference level based on the preferential treatment track information, and displays the SOC level capable of traveling on the track.

Further, display unit 106 receives the preferential treatment availability information and the SOC information from vehicle ECU 110. Based on the received preferential treatment availability information, display unit 106 displays entry prohibition for the track where the hybrid vehicle 10 cannot receive any preferential treatment, and displays the current SOC of electric storage 22 based on the SOC information.

Map information memory 108 consists of a storage medium such as a DVD (Digital Versatile Disk), a hard disk and a ROM (Read Only Memory), and stores the map data on tracks. Map information memory 108 outputs necessary map data to display unit 106 corresponding to a request from display unit 106.

Server 50 includes an interface unit 52, a track information storage 54 and a server ECU 56. Interface unit 52 is a transceiver for performing wireless communications between server 50 and controller 30 of hybrid vehicle 10. Interface unit 52 outputs the SOC information and the position information received from controller 30 of hybrid vehicle 10 to server ECU 56. Further, interface unit 52 transmits the preferential treatment track information and the preferential treatment availability information received from server ECU 56 to controller 30 of hybrid vehicle 10.

Track information storage 54 stores the preferential treatment track information, that is, the information on the track where hybrid vehicle 10 can receive the preferential treatment under a predetermined condition, and outputs necessary preferential treatment track information to server ECU 56 corresponding to a request from server ECU 56. More specifically, track information storage 54 stores each track, correspondingly with the reference level, where hybrid vehicle 10 can travel when the SOC of electric storage 22 exceeds the reference level, and according to the request from server ECU 56 based on the position information of hybrid vehicle 10, outputs the required track and the reference level value of the SOC corresponding thereto to server ECU 56. Note that the reference level of the SOC corresponding to each track can be set to an appropriate level based on various elements. For example, a higher level may be set as the distance of the track giving the preferential treatment is longer.

Server ECU 56 receives the SOC information and the position information of hybrid vehicle 10 from interface unit 52, and requests track information storage 54 for the preferential treatment track information based on the received position information. Then, upon receiving the preferential treatment track information from track information storage 54, server ECU 56 compares the SOC of hybrid vehicle 10 shown by the SOC information from interface unit 52 with the reference level included in the preferential treatment track information from track information storage 54, and determines whether hybrid vehicle 10 can receive the preferential treatment.

Further, server ECU 56 outputs the preferential treatment track information from track information storage 54 and the preferential treatment availability information including the determination result whether hybrid vehicle 10 can receive the preferential treatment, to interface unit 52.

Figure 3:
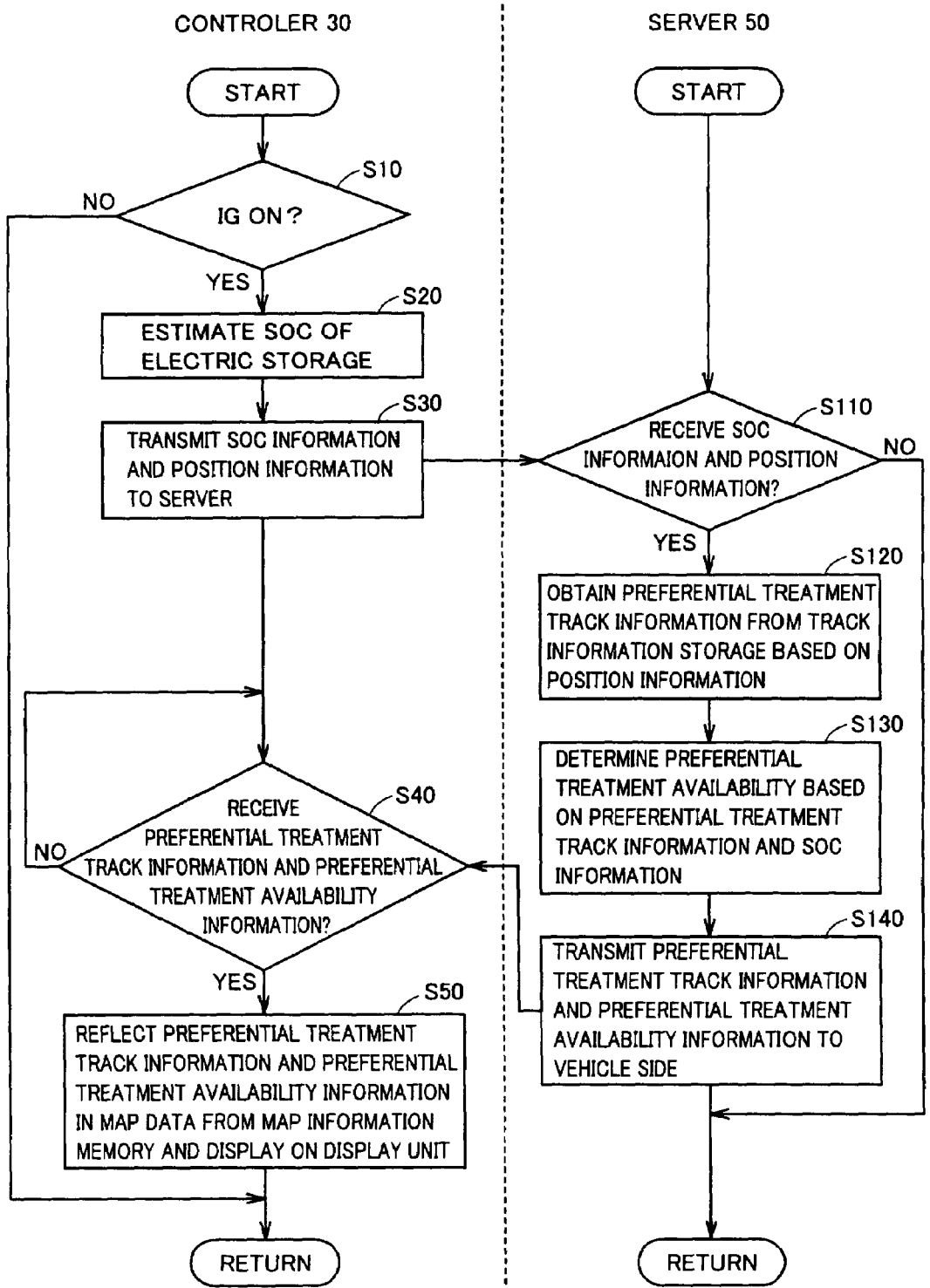
FIG. 3 is a flowchart showing a processing flow of the vehicle preferential treatment system shown in FIG. 2.

FIG. 3 is a flowchart showing a processing flow of vehicle preferential treatment system 100 shown in FIG. 2. Note that a set of processing in each of controller 30 of hybrid vehicle 10 and server 50 is performed repeatedly at regular time intervals or every time a predetermined condition is established.

Referring to FIGS. 2 and 3, vehicle ECU 110 of controller 30 determines whether an ignition key (or ignition switch, hereinafter referred similarly) is turned to an ON position (step S10). If vehicle ECU 110 determines that the ignition key is not at the ON position (NO in step S10), it ends a set of processing.

On the other hand, in step S10, if the ignition key is determined as being at the ON position (YES in step S10), SOC estimation unit 102 of controller 30 estimates the SOC of electric storage 22 (step S20), and outputs the estimated SOC to vehicle ECU 110.

Then, vehicle ECU 110 outputs the SOC information of electric storage 22 estimated by SOC estimation unit 102 and the position information of hybrid vehicle 10 received from vehicle position detection unit 104 to interface unit 112, and interface unit 112 transmits the received SOC information and position information to server 50 (step S30).

When interface unit 52 of server 50 receives the SOC information and the position information of hybrid vehicle 10 (YES in step S110), it outputs the received SOC information and position information to server ECU 56.

Server ECU 56 of server 50 requests track information storage 54 for the preferential treatment track information based on the position information from interface unit 52, and obtains the preferential treatment track information from track information storage 54 (step S120). Then, server ECU 56 compares the SOC of hybrid vehicle 10 shown by the SOC information from interface unit 52 with the reference level included in the preferential treatment track information from track information storage 54, and determines whether hybrid vehicle 10 can receive the preferential treatment (step S130).

Then, server ECU 56 outputs the preferential treatment track information and the preferential treatment availability information showing the determination result whether hybrid vehicle 10 can receive the preferential treatment to interface unit 52, and interface unit 52 transmits the received preferential treatment track information and preferential treatment availability information to controller 30 of hybrid vehicle 10 (step S140).

When interface unit 112 of hybrid vehicle 10 receives the preferential treatment track information and the preferential treatment availability information with respect to hybrid vehicle 10 from server 50 (YES in step S40), it outputs the received preferential treatment track information and preferential treatment availability information to vehicle ECU 110. Then, vehicle ECU 110 outputs the received preferential treatment track information and preferential treatment availability information to display unit 106.

Then, display unit 106 obtains the map data from map information memory 108 based on the position information of hybrid vehicle 10 received from vehicle position detection unit 104. Then, display unit 106 displays the map data from map information memory 108 together with the current position of hybrid vehicle 10.

Further, display unit 106 displays, with emphasis, the track where hybrid vehicle 10 can receive the preferential treatment when the SOC of electric storage 22 is higher than the reference level based on the preferential treatment track information from vehicle ECU 110, together with the reference level of the SOC. For the track where hybrid vehicle 10 cannot receive the preferential treatment because the SOC of electric storage 22 does not reach the reference level, display unit 106 displays entrance prohibition based on the preferential treatment availability information from vehicle ECU 110 together with the current SOC of electric storage 22 based on the SOC information from vehicle ECU 110 (step S50).

Figure 4:
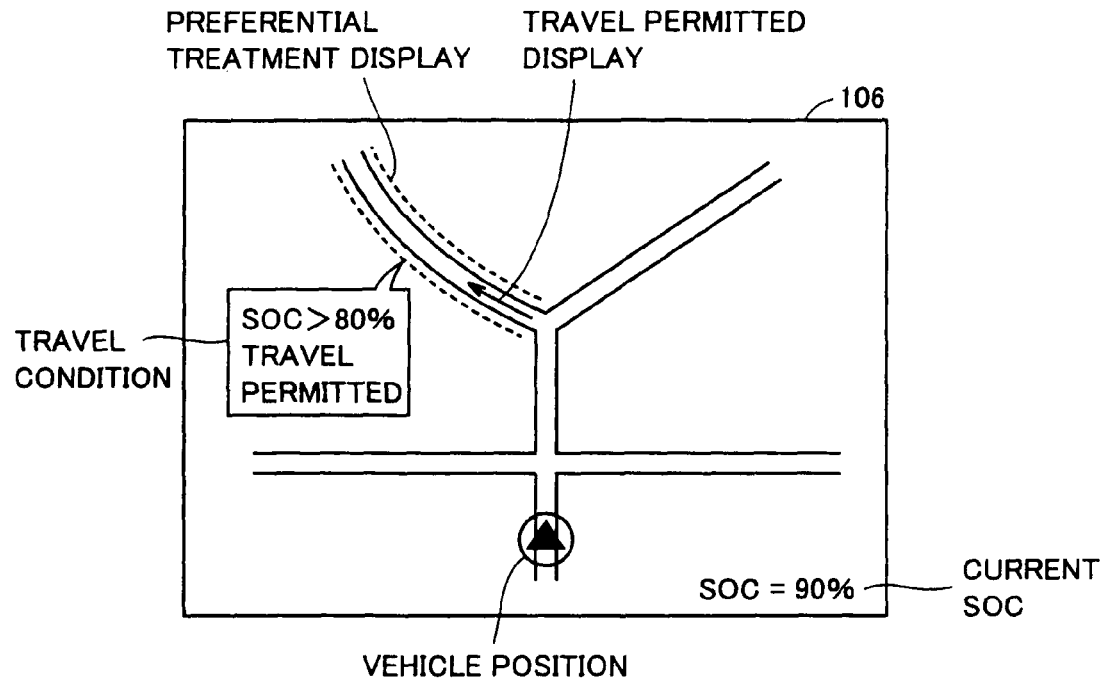
FIG. 4 is an illustration showing a first display state of a display unit shown in FIG. 2.
Figure 5:
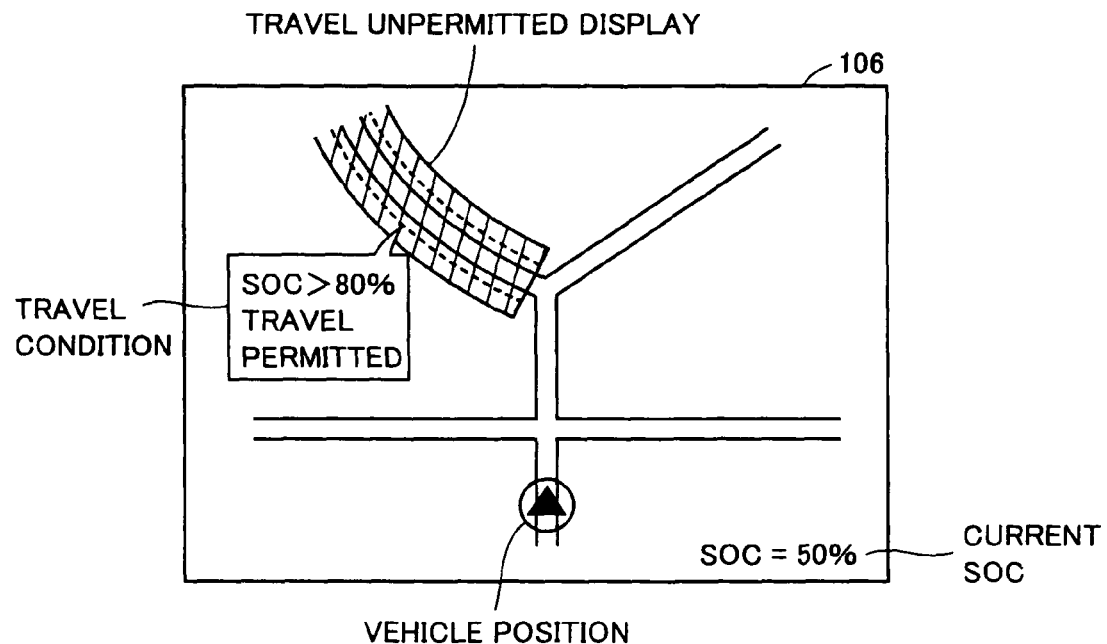
FIG. 5 is an illustration showing a second display state of the display unit shown in FIG. 2.

FIGS. 4 and 5 are illustrations showing display states of display 106 shown in FIG. 2. Referring to FIG. 4, display unit 106 displays the map data from map information memory 108 together with the current position of hybrid vehicle 10 based on the position information from vehicle position detection unit 104. Further, based on the preferential treatment track information from vehicle ECU 110, display unit 106 displays, with emphasis by dotted lines for example, the track where the hybrid vehicle 10 can receive the preferential treatment when the SOC of electric storage 22 exceeds the reference level (e.g., 80%) (preferential treatment display), together with the condition under which hybrid vehicle 10 can travel on the track (travel condition). Further, display unit 106 displays the current SOC of electric storage 22 based on the SOC information from vehicle ECU 110 (current SOC), and also displays with an arrow or the like, that hybrid vehicle 10 can travel on the track with the preferential treatment display since the current SOC satisfies the travel condition in the case shown in FIG. 4 (travel permitted display).

On the other hand, referring to FIG. 5, if the current SOC does not satisfy the travel condition, hybrid vehicle 10 cannot receive the preferential treatment to travel on the track with the preferential treatment display, so display unit 106 displays that hybrid vehicle 10 cannot travel on the track by marking with diagonal lines, for example (travel unpermitted display).

Figure 6:
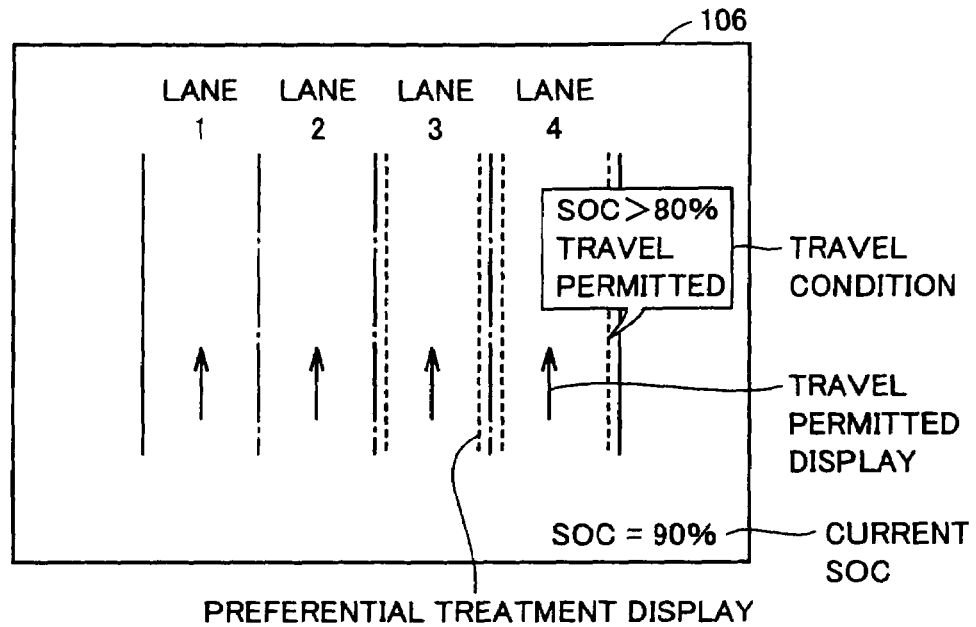
FIG. 6 is an illustration showing another first display state of the display unit shown in FIG. 2.
Figure 7:
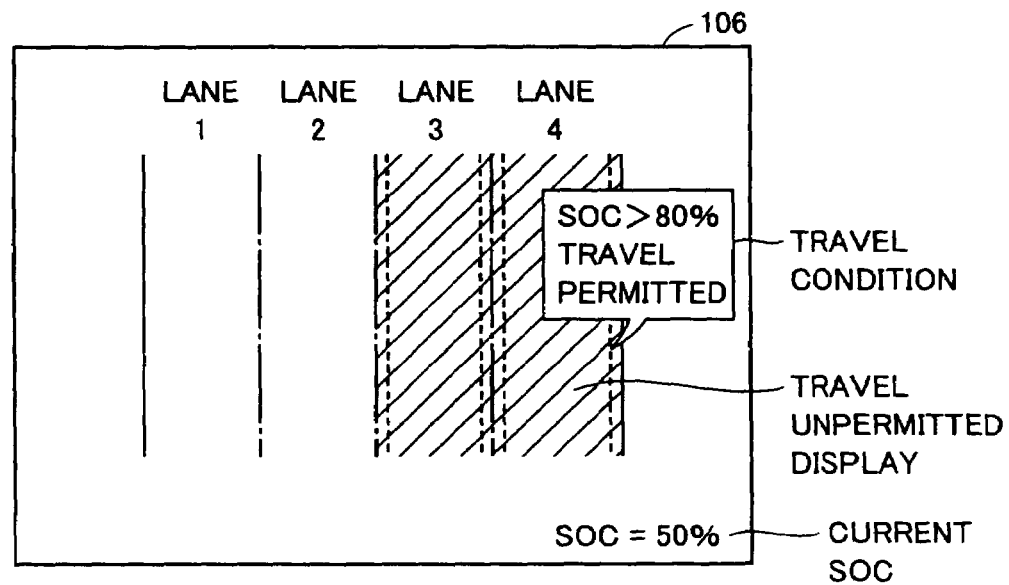
FIG. 7 is a diagram showing another second display state of the display unit shown in FIG. 2.

FIGS. 6 and 7 are illustrations showing another display states of display unit 106 shown in FIG. 2. Referring to FIG. 6, display unit 106 displays a travel lane (lane 1 to 4) of the track on which hybrid vehicle 10 currently travels based on the position information from vehicle position detection unit 104. Further, based on the preferential treatment track information from vehicle ECU 110, display unit 106 displays, with emphasis by dotted lines for example, the lane on which hybrid vehicle 10 can travel in priority when the SOC of electric storage 22 is higher than the reference level (e.g., 80%) (preferential treatment display), together with the condition under which hybrid vehicle 10 can travel on the lane (travel condition). Further, display unit 106 displays the current SOC of electric storage 22 based on the SOC information from vehicle ECU 110 (current SOC), and also displays with an arrow or the like, that hybrid vehicle 10 can travel on the lane with the preferential treatment display since the current SOC satisfies the travel condition in the case shown in FIG. 6 (travel permitted display).

On the other hand, referring to FIG. 7, if the current SOC does not satisfy the travel condition, hybrid vehicle 10 cannot receive the preferential treatment to travel on the lane with the preferential treatment display, so display unit 106 displays that hybrid vehicle 10 cannot travel on the lane by marking with diagonal lines or the like (travel unpermitted display).

As described above, according to vehicle preferential treatment system 100 of embodiment 1, the preferential treatment is given to hybrid vehicle 10 in which the SOC of electric storage 22 exceeds the reference level. Hybrid vehicle 10 in which the SOC level of electric storage 22 is high can travel by electricity for a long distance (in a state of engine 12 being stopped and traveling only with motor generator 20), contributing significantly to environmental protection. In other words, a vehicle contributing significantly to environmental protection can receive the preferential treatment.

Embodiment 2

A hybrid vehicle according to embodiment 2 of the present invention further includes an announcement device 114 in the configuration of hybrid vehicle 10 according to embodiment 1 shown in FIG. 1, and includes a controller 30A instead of controller 30. Announcement device 114 is disposed on the vehicle outside surface, and announces that the hybrid vehicle travels while receiving the preferential treatment, based on an announcement instruction from controller 30A.

Figure 8:
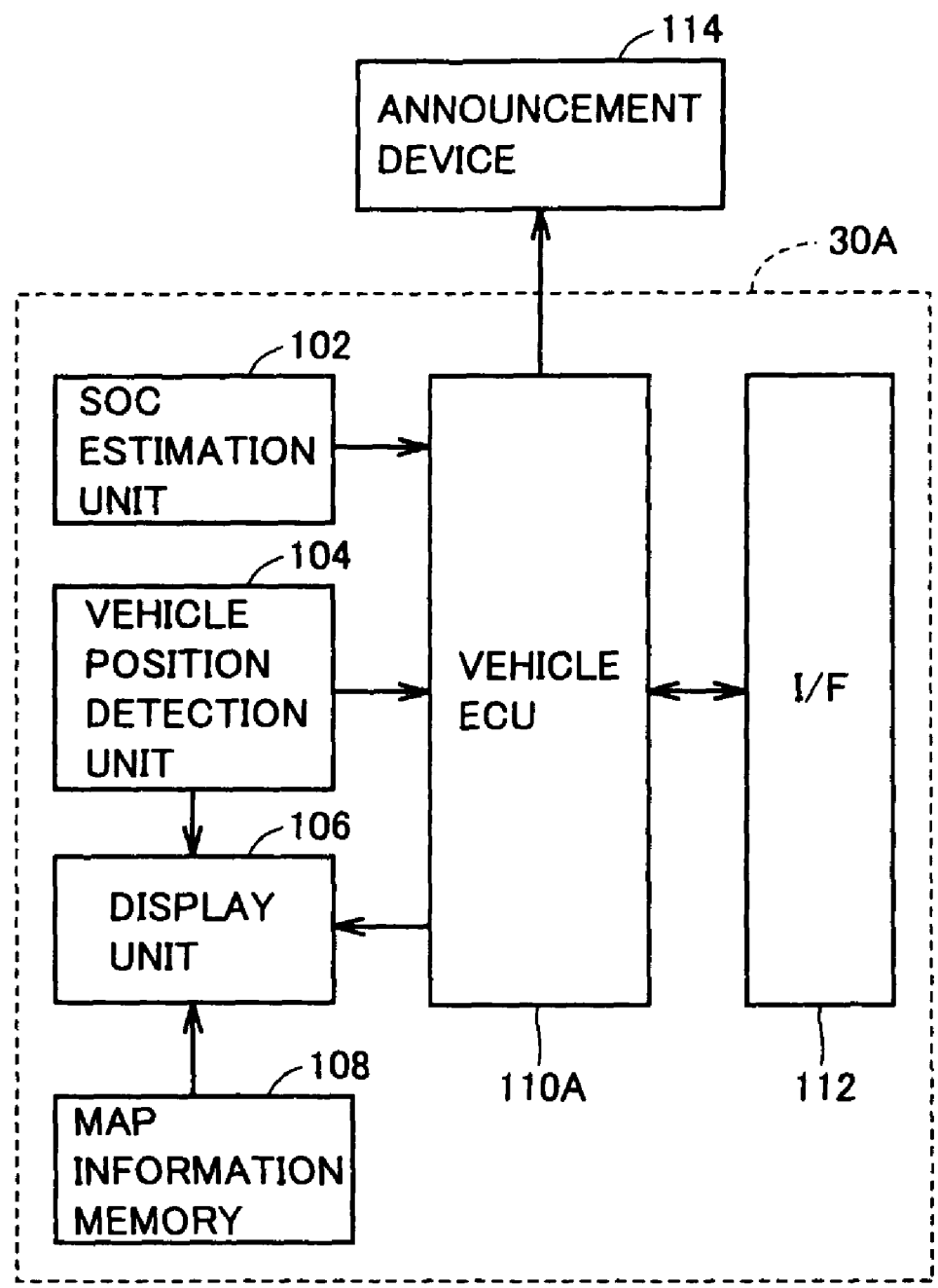
FIG. 8 is a function block diagram of a controller according to embodiment 2 of the present invention.

FIG. 8 is a function block diagram of controller 30A according to embodiment 2 of the present invention. Referring to FIG. 8, controller 30A includes a vehicle ECU 110A instead of vehicle ECU 110 in the configuration of controller 30 in embodiment 1 shown in FIG. 2. Vehicle ECU 110A determines whether the vehicle is currently entering the track where it can receive the preferential treatment, based on the position information from vehicle position detection unit 104. Based on the determination result and the preferential treatment availability information received from server 50, vehicle ECU 110A outputs the announcement instruction to announcement device 114 when the vehicle is entering the track and receives the preferential treatment to travel on the track.

When announcement device 114 receives the announcement instruction from vehicle ECU 110A, it operates according to the announcement instruction. Announcement device 114 is formed of a display lamp which is lighted or flashes when receiving the announcement instruction, a movable article which protrudes when receiving the announcement instruction, or the like.

Note that other functions of vehicle ECU 110A are the same as those of vehicle ECU 110 in embodiment 1.

As described above, according to embodiment 2, when the preferential treatment is given to the hybrid vehicle, the fact is announced to the outside of the vehicle by announcement unit 114. Therefore, it is possible to specify the vehicle illegally traveling in the specific area (nature conservation area, urban area, or the like) shown in FIGS. 4 and 5 and in the preferential treatment lane shown in FIGS. 6 and 7, for example.

Embodiment 3

Figure 9:
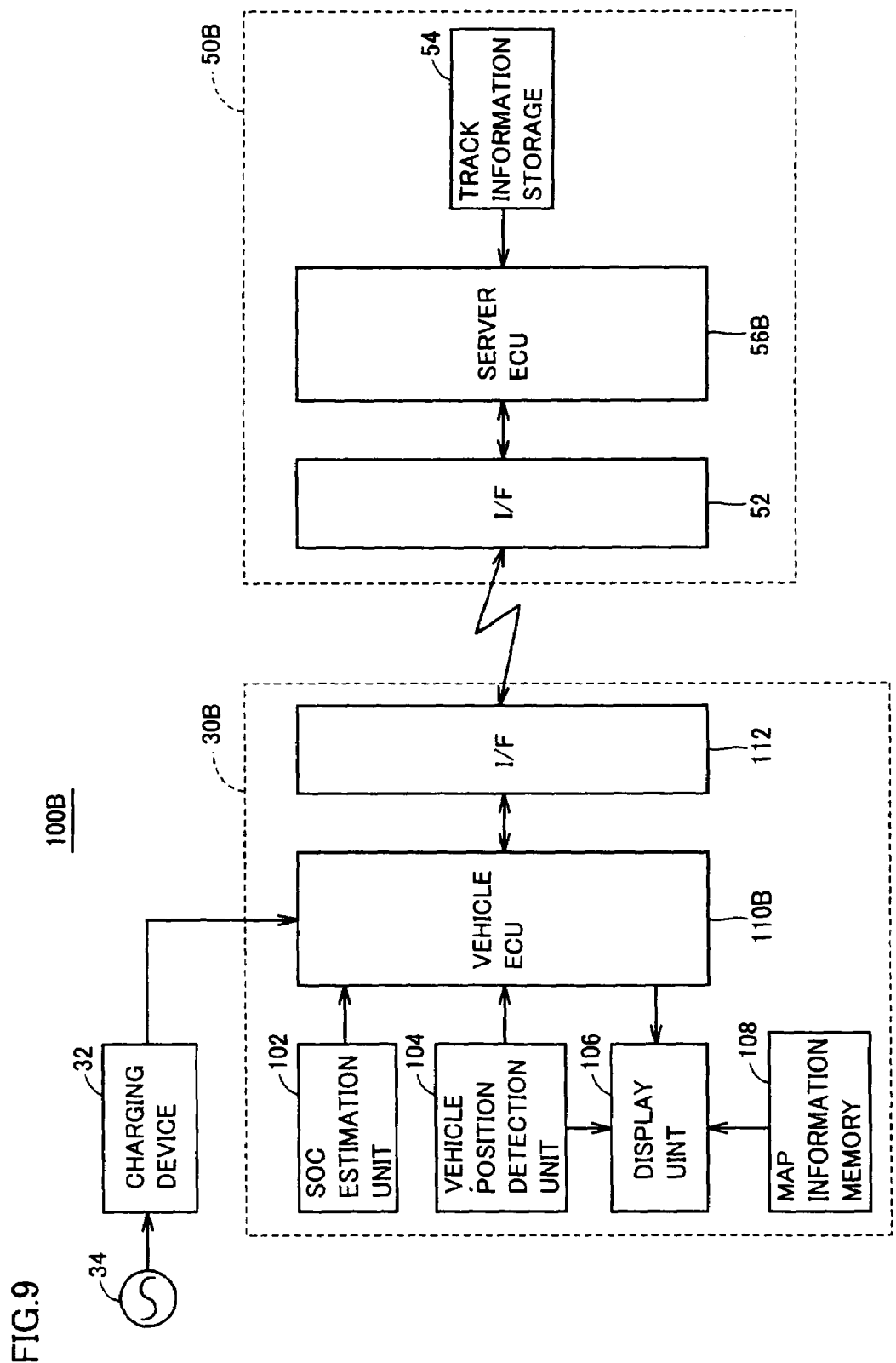
FIG. 9 is a function block diagram of a vehicle preferential treatment system according to embodiment 3 of the present invention.

FIG. 9 is a function block diagram of a vehicle preferential treatment system 100B according to embodiment 3 of the present invention. Referring to FIG. 9, vehicle preferential treatment system 100B includes a controller 30B and a server 50B. Controller 30B includes a vehicle ECU 110B instead of vehicle ECU 110 in the configuration of controller 30 in embodiment 1 shown in FIG. 2. Further, server 50B includes a server ECU 56B instead of server ECU 56 in the configuration of server 50 in embodiment 1 shown in FIG. 2.

In embodiment 3, during charging from commercial power source 34 to electric storage 22, charging device 32 outputs a signal indicating charging being performed, to vehicle ECU 110B.

Vehicle ECU 110B calculates the charge amount from commercial power source 34 to electric storage 22 performed by charging device 32. Specifically, vehicle ECU 110B calculates a difference between the SOC of electric storage 22 after charging by charging device 32 having been completed and the SOC of electric storage 22 before starting the charging based on the signal from charging device 32, and the amount of difference is considered as the charge amount from commercial power source 34 to electric storage 22. Then, vehicle ECU 110B stores the charge amount, and when the ignition key is turned to the ON position so as to be in a state capable of traveling, vehicle ECU 110B reads out the charge amount and outputs it as information on charging from external source (external charging information) to interface unit 112.

Note that other functions of vehicle ECU 110B are the same as those of vehicle ECU 110 in embodiment 1.

Then, interface unit 112 transmits the external charging information and the position information from vehicle ECU 110B to server 50B.

Server ECU 56B of server 50B receives the external charging information and the position information of hybrid vehicle 10 from interface unit 52, and requests track information storage 54 for the preferential treatment track information based on the received position information. Further, based on the external charging information received from interface unit 52, server ECU 56B determines whether the hybrid vehicle can receive the preferential treatment. Specifically, server ECU 56B compares the external charge amount indicated by the external charging information (charge amount from commercial power source 34 in the hybrid vehicle) with a predetermined reference amount, and if the external charge amount exceeds the reference amount, it determines that the vehicle can receive the preferential treatment. The reason why the preferential treatment is given when the charge amount from the commercial power source 34 is large is that dependency on the engine in the hybrid vehicle becomes lower as the charge amount from commercial power source 34 is larger, so the amount of exhaust gas exhausted from the hybrid vehicle is reduced in total.

Server ECU 56B outputs the preferential treatment track information from track information storage 54 and the preferential treatment availability information including the determination result whether the hybrid vehicle can receive the preferential treatment to interface unit 52.

Note that other configurations of server 50B are the same as those of server 50 in embodiment 1.

Figure 10:
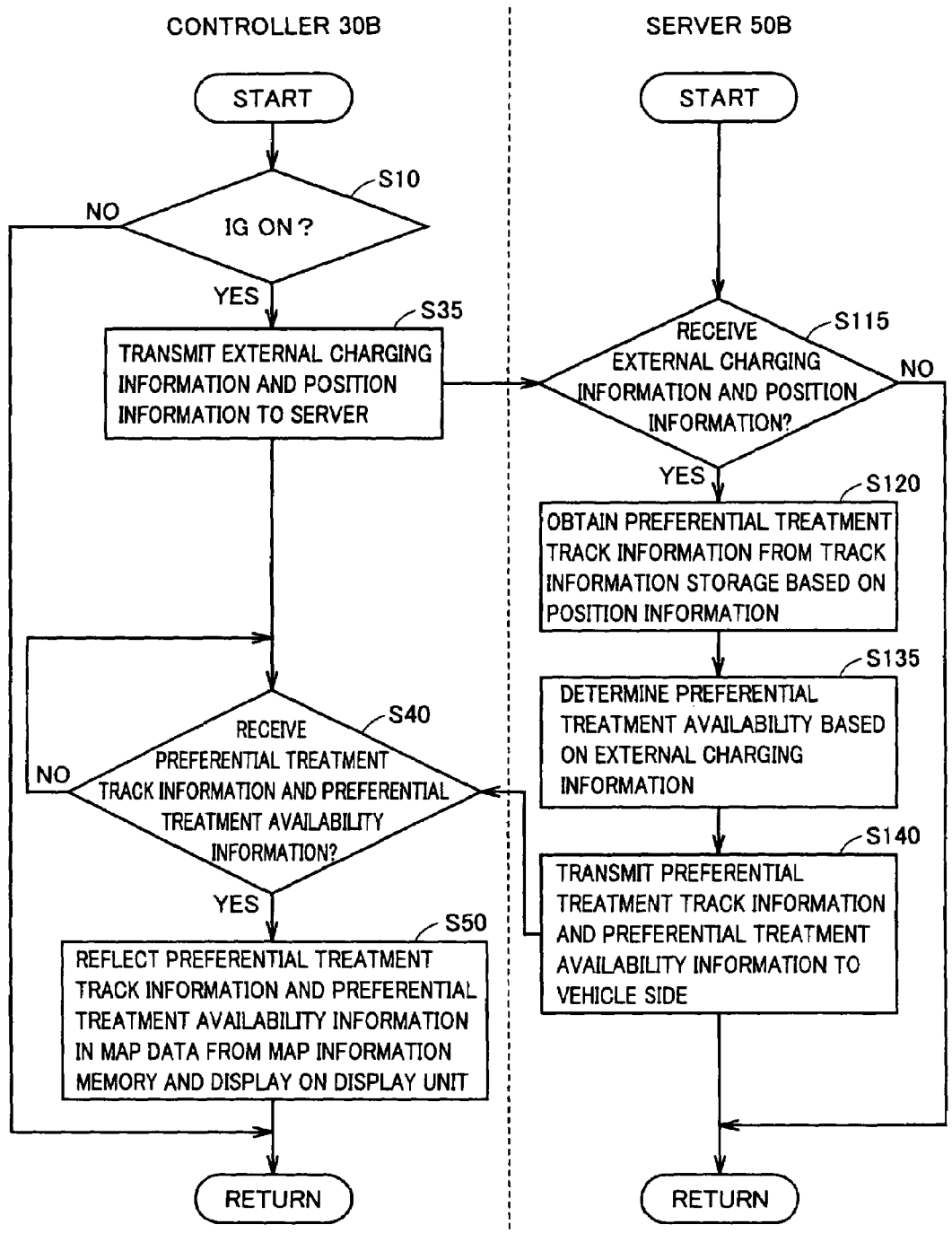
FIG. 10 is a flowchart showing a processing flow of the vehicle preferential treatment system shown in FIG. 9.

FIG. 10 is a flowchart showing a processing flow of vehicle preferential treatment system 100B shown in FIG. 9. Note that a set of processing in each of controller 30B and server 50B is carried out repeatedly at regular time intervals or every time the predetermined condition is established.

Referring to FIG. 10, if it is determined that the ignition key is at the ON position in step S10 (YES in step S10), vehicle ECU 110B reads out the external charging information indicating the charge amount from commercial power source 34 to electric storage 22, and outputs it to interface unit 112 together with the position information from vehicle position detection unit 104. Then, interface unit 112 transmits the received external charging information and position information to server 50B (step S35).

When interface unit 52 of server 50B receives the external charging information and the position information (YES in step S115), it outputs the received external charging information and position information to server ECU 56B.

In step S120, when the preferential treatment track information is obtained from track information storage 54 based on the position information, server ECU 56B compares the external charge amount (charge amount from commercial power source 34 in the hybrid vehicle) indicated by the external charging information with the reference amount, and determines whether the hybrid vehicle transmitting the external charging information can receive the preferential treatment (step S135).

Then, in step S140, the preferential treatment track information and the preferential treatment availability information showing the determination result indicating whether the hybrid vehicle can receive the preferential treatment are transmitted to the hybrid vehicle via interface unit 52.

Note that processing in other steps is the same as that of the flowchart shown in FIG. 3, so the description is not repeated.

As described above, according to vehicle preferential treatment system 100B according to embodiment 3, the preferential treatment is given to the hybrid vehicle in which the charge amount from commercial power source 34 exceeds the reference amount. The hybrid vehicle in which the charge amount from commercial power source 34 is large has less dependency on the engine and makes high contributions to environmental protection. That is, the vehicle making high contributions to environmental protection can receive the preferential treatment.

Although the hybrid vehicle having the large charge amount from commercial power source 34 to electric storage 22 can receive the preferential treatment in embodiment 3, the charge time may be used instead of the charge amount. That is, the hybrid vehicle having the long charge time from commercial power source 34 to electric storage 22 may receive the preferential treatment.

Also in embodiment 3, announcing device 114 may be provided as in embodiment 2.

The preferential treatment may be given in a case where the charge amount from commercial power source 34 to electric storage 22 is large (or charge time is long) and the SOC of electric storage 22 is large, by combining embodiment 1 (or embodiment 2) and embodiment 3.

Although the vehicle holds the map data in each of embodiments 1 to 3, the map data may be held on the server and transmitted to the vehicle together with the preferential treatment track information.

Note that in the description above, motor generator 20 corresponds to the "motor" in the present invention, and SOC estimation unit 102 corresponds to the "estimation unit" in the present invention. Further, interface unit 112 corresponds to the "first transmission unit" and the "first reception unit" in the present invention, and display unit 106 corresponds to the "display unit" in the present invention. Further, interface unit 52 corresponds to the "second transmission unit" and the "second reception unit" in the present invention, and server ECU 56 corresponds to the "determination unit" in the present invention.

Moreover, charging device 32 corresponds to the "charging unit" in the present invention, and vehicle ECU 110B corresponds to the "calculation unit" in the present invention. Announcing device 114 corresponds to the "announcement unit" in the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle preferential treatment system comprising:
an electrically powered vehicle; and
a server capable of communicating with said electrically powered vehicle,
wherein said electrically powered vehicle includes:
an electric storage;
a motor generating a driving force of the vehicle by using electric power from said electric storage;
a charging unit configured to be able to charge said electric storage from a commercial power source;
a calculation unit calculating a charge amount or a charge time by said charging unit;
a first transmission unit transmitting the charge amount or the charge time calculated by said calculation unit to said server;
a first reception unit receiving information on a predetermined preferential treatment with respect to the electrically powered vehicle from said server; and
a display unit displaying the received information, and
said server includes:
a second reception unit receiving said charge amount or said charge time from said electrically powered vehicle;
a determination unit determining whether to give said predetermined preferential treatment to said electrically powered vehicle based on said charge amount or said charge time; and
a second transmission unit transmitting the information on said predetermined preferential treatment to said electrically powered vehicle based on a determination result by said determination unit, the predetermined preferential treatment corresponding to allowing the electrically powered vehicle to access a preferred lane among a plurality of lanes on a single roadway.

2. The vehicle preferential treatment system according to claim 1, wherein said determination unit determines to give said predetermined preferential treatment to said electrically powered vehicle when said charge amount exceeds a predetermined value or said charge time exceeds a predetermined time.

3. The vehicle preferential treatment system according to claim 1, wherein said electrically powered vehicle further includes announcement unit announcing such a fact to an outside of the vehicle when said predetermined preferential treatment is given.

* * * * *